United States Patent
Xu et al.

(10) Patent No.: US 12,317,311 B2
(45) Date of Patent: May 27, 2025

(54) DELAY-DEPENDENT PRIORITY FOR EXTENDED REALITY DATA COMMUNICATIONS

(71) Applicant: QUALCOMM Incorporated, San Diego, CA (US)

(72) Inventors: Huilin Xu, Temecula, CA (US); Seyedkianoush Hosseini, San Diego, CA (US); Wanshi Chen, San Diego, CA (US); Juan Montojo, San Diego, CA (US); Yuchul Kim, San Diego, CA (US); Peter Gaal, San Diego, CA (US); Liangping Ma, San Diego, CA (US); Linhai He, San Diego, CA (US); Yeliz Tokgoz, San Diego, CA (US); Jay Kumar Sundararajan, San Diego, CA (US); Nicolas Cornillet, Lannion (FR)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/810,089

(22) Filed: Jun. 30, 2022

(65) Prior Publication Data
US 2024/0008071 A1    Jan. 4, 2024

(51) Int. Cl.
*H04W 72/566*    (2023.01)
*H04W 72/21*    (2023.01)
*H04W 72/23*    (2023.01)

(52) U.S. Cl.
CPC ......... *H04W 72/569* (2023.01); *H04W 72/21* (2023.01); *H04W 72/23* (2023.01)

(58) Field of Classification Search
CPC ... H04W 72/569; H04W 72/21; H04W 72/23; H04W 72/11; H04W 72/115
See application file for complete search history.

(56) References Cited

U.S. PATENT DOCUMENTS

| | | | | |
|---|---|---|---|---|
| 2021/0037559 | A1* | 2/2021 | Hande | H04L 67/06 |
| 2022/0039127 | A1* | 2/2022 | Li | H04W 72/1268 |
| 2024/0260023 | A1* | 8/2024 | Park | H04W 72/51 |
| 2024/0298320 | A1* | 9/2024 | Wong | H04W 72/566 |

FOREIGN PATENT DOCUMENTS

| | | | | |
|---|---|---|---|---|
| CN | 111106863 A | * | 5/2020 | H04B 7/06 |
| WO | WO-2023021710 A1 | * | 2/2023 | |
| WO | WO-2023052806 A1 | * | 4/2023 | H04L 5/0035 |
| WO | WO-2023211941 A1 | * | 11/2023 | |

* cited by examiner

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a network node may communicate, based at least in part on a physical data channel configuration corresponding to a physical data channel, a first extended reality (XR) data communication corresponding to a first physical data channel occasion associated with the physical data channel configuration, wherein a first priority level is associated with the first XR data communication. The network node may communicate a second XR data communication corresponding to a second physical data channel occasion, wherein a second priority level is associated with the second XR data communication, and wherein the second priority level is higher than the first priority level based at least in part on a packet delay budget associated with the physical data channel configuration being within a specified threshold of packet delay. Numerous other aspects are described.

30 Claims, 8 Drawing Sheets

DELAY-DEPENDENT PRIORITY FOR EXTENDED REALITY DATA COMMUNICATIONS

FIELD OF THE DISCLOSURE

Aspects of the present disclosure generally relate to wireless communication and to techniques and apparatuses for delay-dependent priority for extended reality data communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes (e.g., base stations) that support communication for other network nodes (e.g., wireless communication devices), such as a user equipment (UE) or multiple UEs. A UE may communicate with a base station via downlink communications and uplink communications. "Downlink" (or "DL") refers to a communication link from the network node to the UE, and "uplink" (or "UL") refers to a communication link from the UE to the base station. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network node for wireless communication. The network node may include a memory and one or more processors coupled to the memory. The one or more processors may be configured to communicate, based at least in part on a physical data channel configuration corresponding to a physical data channel, a first extended reality (XR) data communication corresponding to a first physical data channel occasion associated with the physical data channel configuration, wherein a first priority level is associated with the first XR data communication. The one or more processors may be configured to communicate a second XR data communication corresponding to a second physical data channel occasion, wherein a second priority level is associated with the second XR data communication, and wherein the second priority level is higher than the first priority level based at least in part on a packet delay budget (PDB) associated with the physical data channel configuration being within a specified threshold of packet delay.

Some aspects described herein relate to a network node for wireless communication. The network node may include a memory and one or more processors coupled to the memory. The one or more processors may be configured to transmit configuration information comprising a physical data channel configuration corresponding to a physical data channel for carrying extended reality data communications. The one or more processors may be configured to communicate, based at least in part on the physical data channel configuration, a first XR data communication corresponding to a first physical data channel occasion associated with the physical data channel configuration, wherein a first priority level is associated with the first XR data communication. The one or more processors may be configured to communicate a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

Some aspects described herein relate to a method of wireless communication performed by a network node. The method may include communicating, based at least in part on a physical data channel configuration corresponding to a physical data channel, a first XR data communication corresponding to a first physical data channel occasion associated with the physical data channel configuration, wherein a first priority level is associated with the first XR data communication. The method may include communicating a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

Some aspects described herein relate to a method of wireless communication performed by a network node. The method may include transmitting configuration information comprising a physical data channel configuration corresponding to a physical data channel for carrying extended reality data communications. The method may include communicating, based at least in part on the physical data channel configuration, a first XR data communication corresponding to a first physical data channel occasion associated with the physical data channel configuration, wherein a first priority level is associated with the first XR data communication. The method may include communicating a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

Some aspects described herein relate to a non-transitory computer-readable medium that stores a set of instructions for wireless communication by a network node. The set of instructions, when executed by one or more processors of the network node, may cause the network node to communicate, based at least in part on a physical data channel configuration corresponding to a physical data channel, a first XR data communication corresponding to a first physical data channel occasion associated with the physical data channel configuration, wherein a first priority level is associated with the first XR data communication. The set of instructions, when executed by one or more processors of the network node, may cause the network node to communicate a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

Some aspects described herein relate to a non-transitory computer-readable medium that stores a set of instructions for wireless communication by a network node. The set of instructions, when executed by one or more processors of the network node, may cause the network node to transmit configuration information comprising a physical data channel configuration corresponding to a physical data channel for carrying extended reality data communications. The set of instructions, when executed by one or more processors of the network node, may cause the network node to communicate, based at least in part on the physical data channel configuration, a first XR data communication corresponding to a first physical data channel occasion associated with the physical data channel configuration, wherein a first priority level is associated with the first XR data communication. The set of instructions, when executed by one or more processors of the network node, may cause the network node to communicate a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

Some aspects described herein relate to an apparatus for wireless communication. The apparatus may include means for communicating, based at least in part on a physical data channel configuration corresponding to a physical data channel, a first XR data communication corresponding to a first physical data channel occasion associated with the physical data channel configuration, wherein a first priority level is associated with the first XR data communication. The apparatus may include means for communicating a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

Some aspects described herein relate to an apparatus for wireless communication. The apparatus may include means for transmitting configuration information comprising a physical data channel configuration corresponding to a physical data channel for carrying extended reality data communications. The apparatus may include means for communicating, based at least in part on the physical data channel configuration, a first XR data communication corresponding to a first physical data channel occasion associated with the physical data channel configuration, wherein a first priority level is associated with the first XR data communication. The apparatus may include means for communicating a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
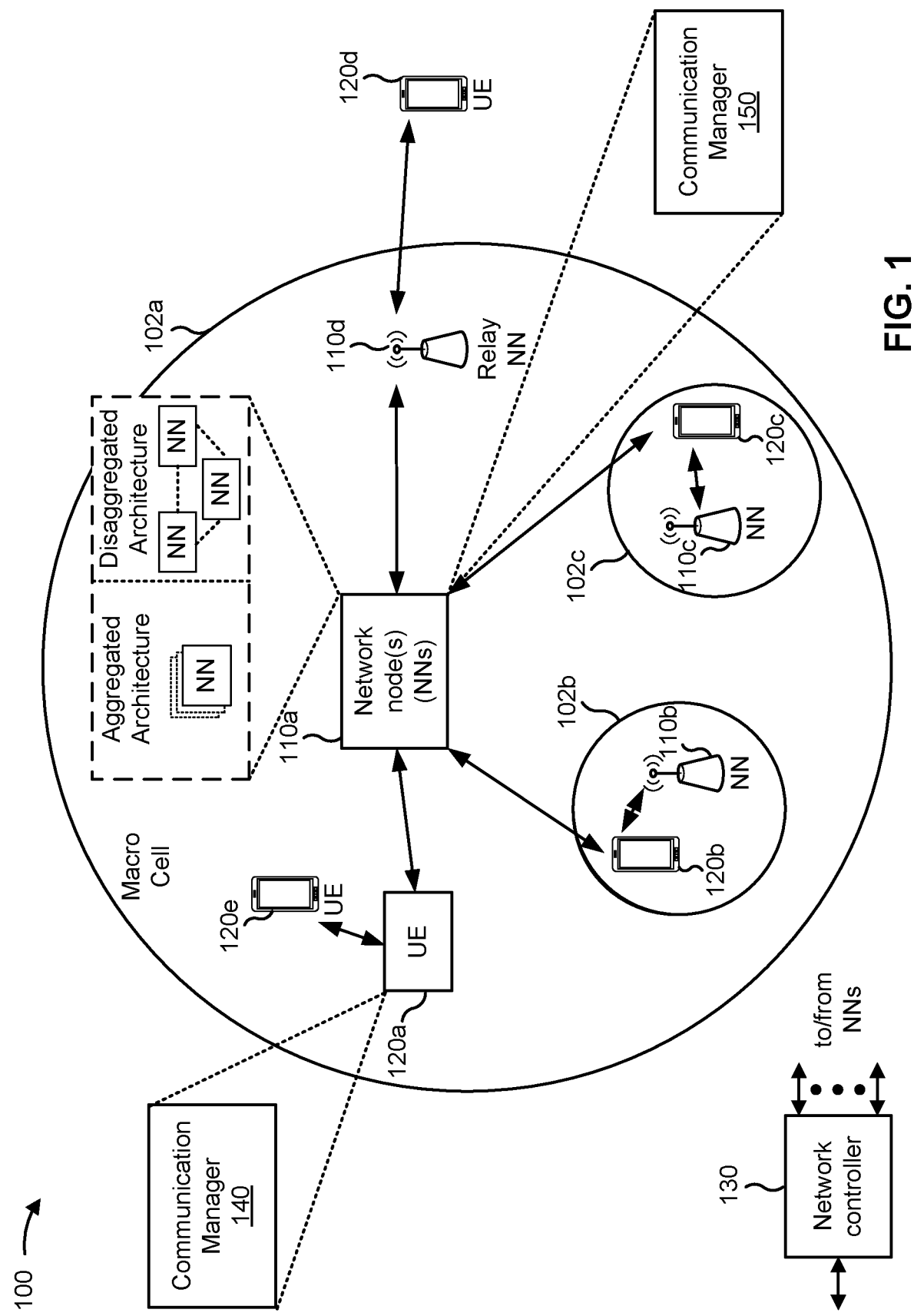
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node may include a communication manager 140 or a communication manager 150. As described in more detail elsewhere herein, the communication manager 140 or 150 may communicate, based at least in part on a physical data channel configuration corresponding to a physical data channel, a first extended reality (XR) data communication corresponding to a first physical data channel occasion associated with the physical data channel configuration, wherein a first priority level is associated with the first XR data communication; and communicate a second XR data communication corresponding to a second physical data channel occasion, wherein a second priority level is associated with the second XR data communication, and wherein the second priority level is higher than the first priority level based at least in part on a packet delay budget (PDB) associated with the physical data channel configuration being within a specified threshold of packet delay.

As described in more detail elsewhere herein, the communication manager 140 or 150 may transmit configuration information comprising a physical data channel configuration corresponding to a physical data channel for carrying extended reality data communications; communicate, based at least in part on the physical data channel configuration, a first XR data communication corresponding to a first physical data channel occasion associated with the physical data channel configuration, wherein a first priority level is associated with the first XR data communication; and communicate a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay. Additionally, or alternatively, the communication manager 140 or 150 may perform one or more other operations described herein.

As indicated above, FIG. 1 is provided as an example. Other examples may differ from what is described with regard to FIG. 1.

Figure 2:
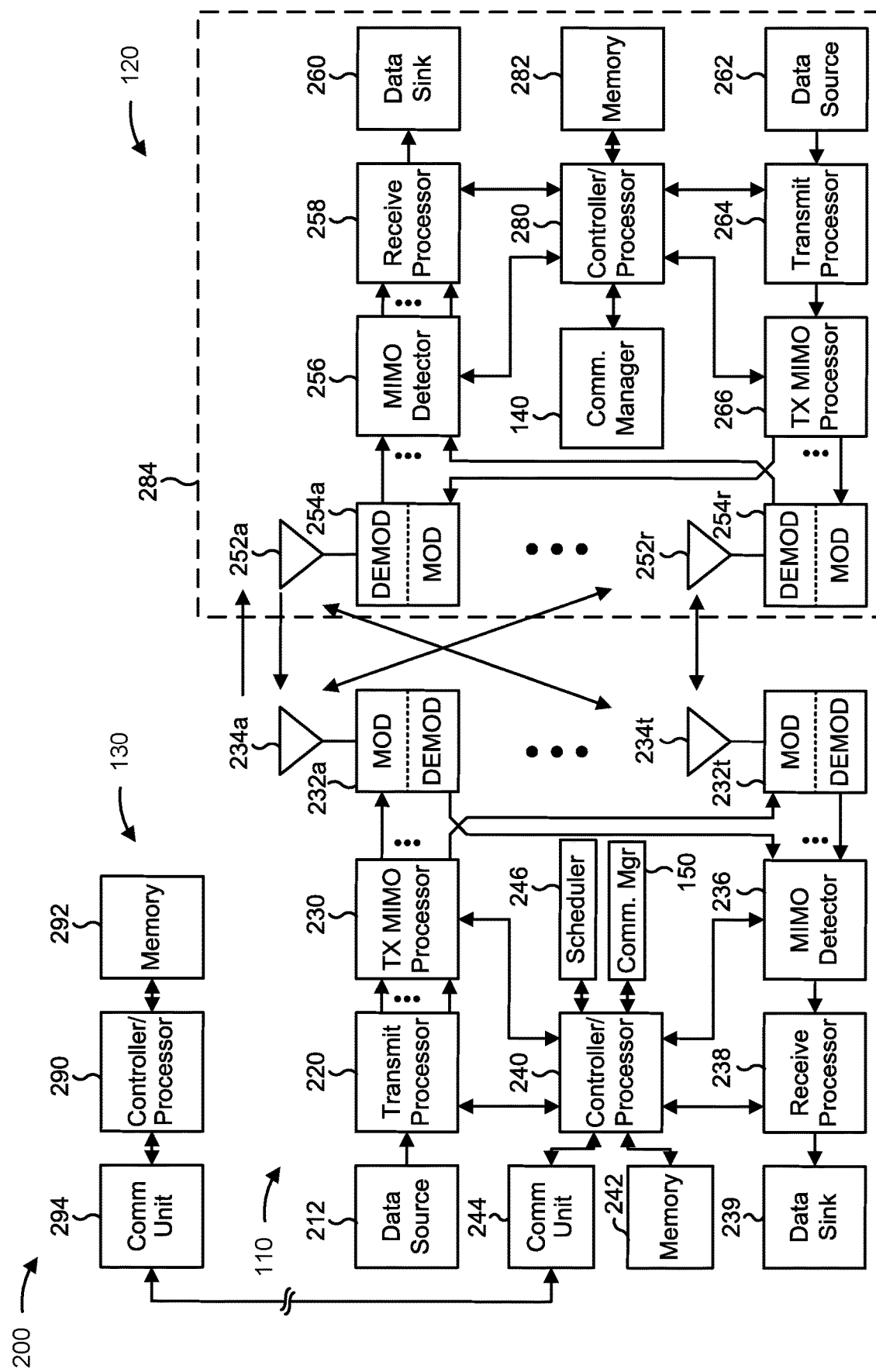
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the network node 110, the controller/processor 280 of the UE 120, and/or any other component(s) of FIG. 2 may perform one or more techniques associated with delay-dependent priority for XR data communications, as described in more detail elsewhere herein. In some aspects, the network node described herein is the UE 120, is included in the UE 120, or includes one or more components of the UE 120 shown in FIG. 2. In some aspects, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the network node includes means for communicating, based at least in part on a physical data channel configuration corresponding to a physical data channel, a first XR data communication corresponding to a first physical data channel occasion associated with the physical data channel configuration, wherein a first priority level is associated with the first XR data communication; and/or means for communicating a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

In some aspects, the network node includes means for transmitting configuration information comprising a physical data channel configuration corresponding to a physical data channel for carrying extended reality data communications; means for communicating, based at least in part on the physical data channel configuration, a first XR data communication corresponding to a first physical data channel occasion associated with the physical data channel configuration, wherein a first priority level is associated with the first XR data communication; and/or means for communicating a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
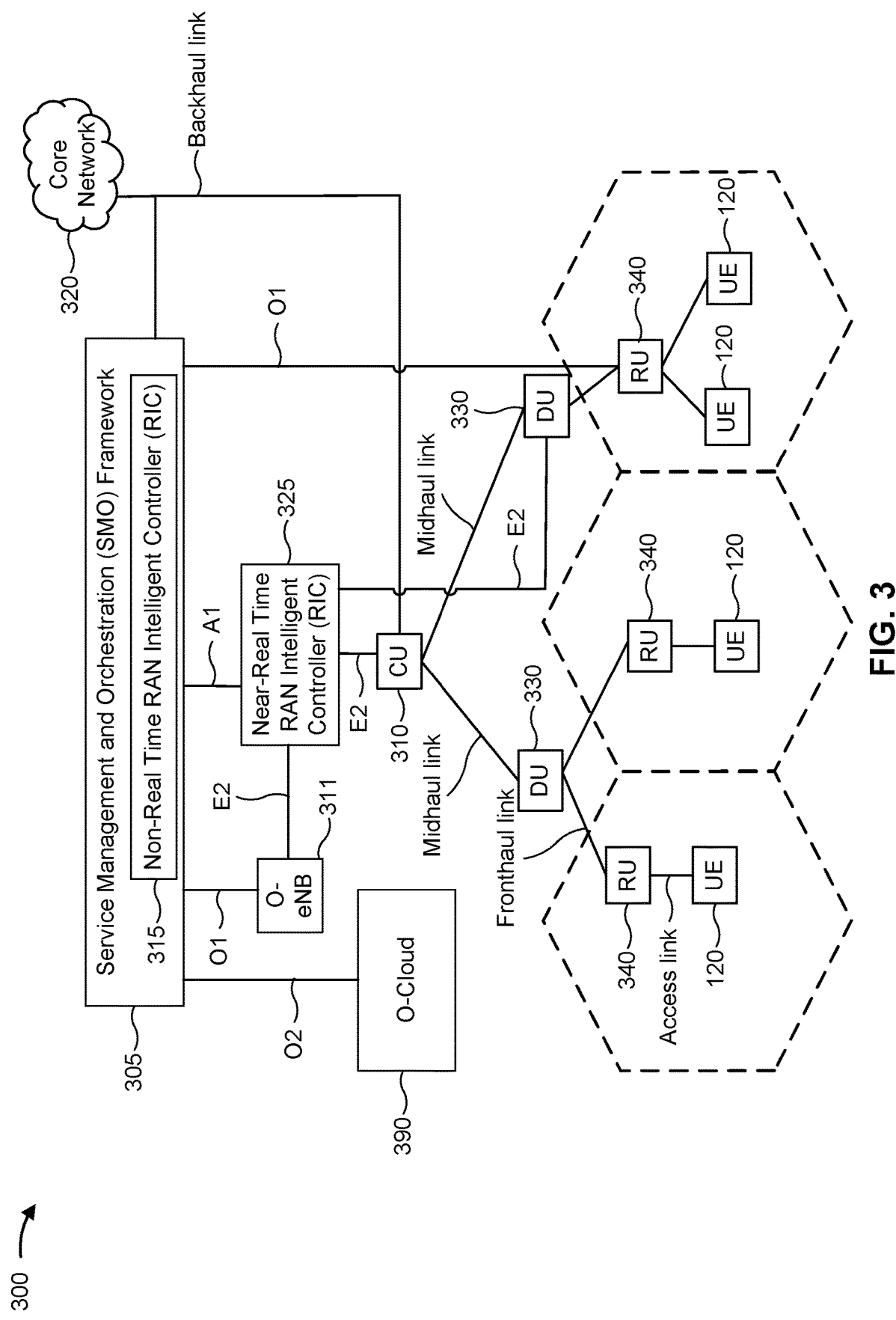
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units. 120. In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT MC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
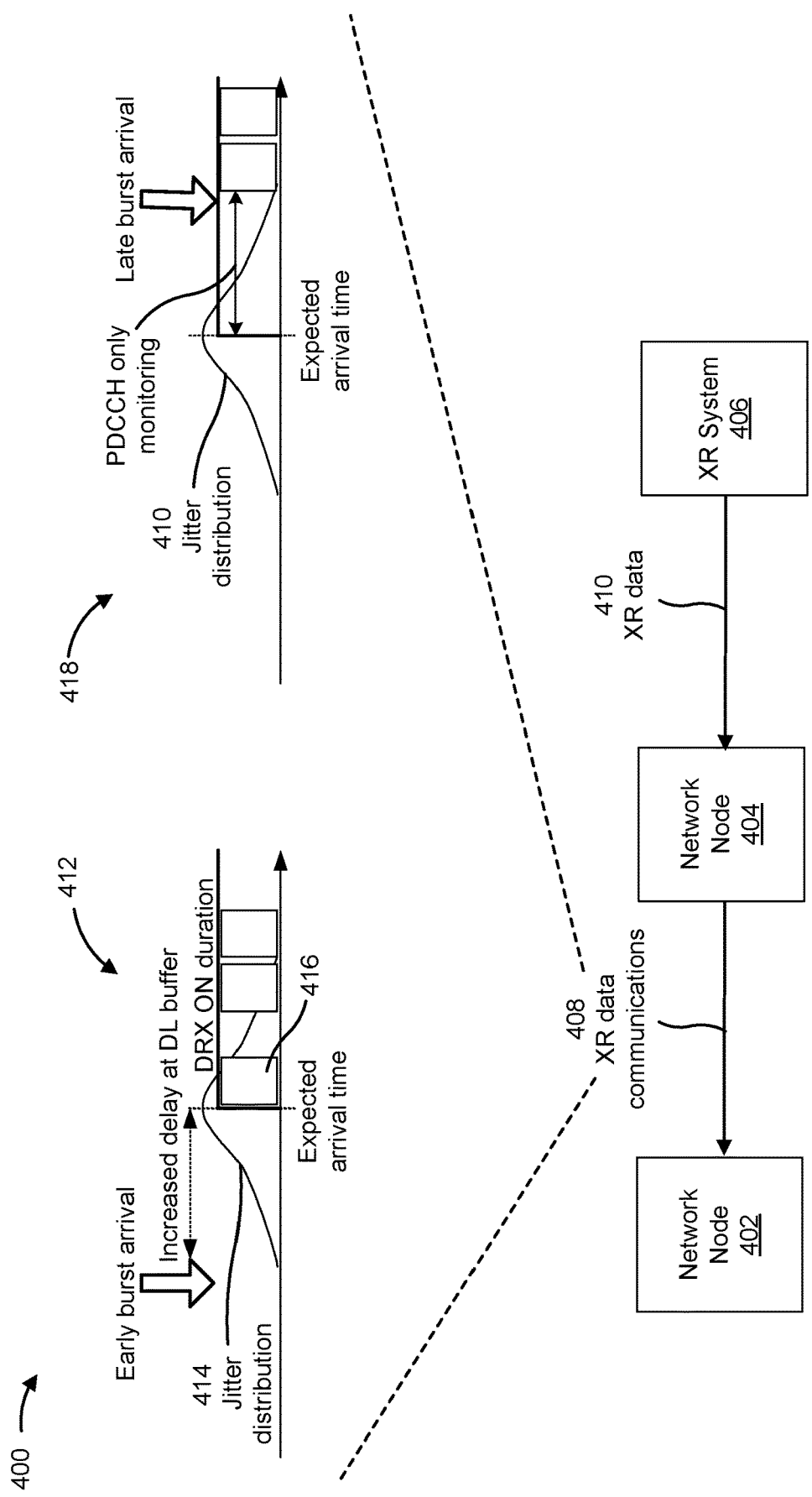
FIG. 4 is a diagram illustrating an example of extended reality (XR) data communications, in accordance with the present disclosure.

FIG. 4 is a diagram illustrating an example 400 of XR data communications, in accordance with the present disclosure. As shown in example 400, a network node 402 and a network node 404 may communicate with one another. The network nodes 402 and 404 may communicate XR data. The network node 404 may communicate with an XR system 406, which may include one or more XR data servers, XR data relays, and/or other entities configured to support XR services provided to the network node 402. XR may include virtual reality (VR), augmented reality (AR), and/or mixed reality (MR), among other examples.

In some cases, a part of XR communication includes video frame transmission. For example, as shown, the network node 404 may transmit XR data communications 408 to the network node 402. The XR data communications 408 may include video frames that are transmitted periodically. Arrival time of XR data 410 (e.g., video frames), at the network node 404 from the XR system 406, can be subject to random jitter. The jitter can be assumed to follow a truncated Gaussian distribution with a zero mean, a 2 millisecond (ms) standard deviation, and a range of [−4, 4] ms. Additionally, in some cases, XR data 410 can have a variable frame size, which also can be assumed to follow a truncated Gaussian distribution. For example, for AR/VR data, video frames can be transmitted at 30 megabytes per second (Mbps), and a minimum packet size can be 31250 bytes, a maximum packet size can be 93750 bytes, and a mean packet size can be 62500 bytes. Transmission of data of this size can require 5, 10, and/or 15 slots for 100 MHz bandwidth with 30 kHz subcarrier spacing, a 16 quadrature-amplitude-modulation (QAM), and a 1/3 code rate.

Limited delay budgets can be established for XR video frames (e.g., for AR/VR, a delay budget can be 10 ms from the time when the video frame arrives at the network node 404 to the time it is successfully transferred to the network node 402). Jitter and variable frame size can be better accommodated using certain dynamic signaling (e.g., wake-up signals and/or scheduling downlink control information (DCI), among other examples) to indicate data arrival times and number of slots with physical data communication channels for transmitting the data.

As shown by reference number 412, an early burst arrival, at the network node 402, of XR data (e.g., an arrival of XR data near a first end of a jitter distribution 414) may result in increased delay at a buffer (e.g., a downlink buffer) since the physical data communication channel 416 scheduled for transmitting the data associated with the burst can occur adjacent to an expected arrival time, near the center of the jitter distribution. In some cases, as shown, the early burst arrival can occur outside of a discontinuous reception (DRX) on duration, which can result in delayed reception of the XR data. As shown by reference number 18, a late burst arrival can occur outside of the DRX on duration, which can result in an unsuccessful reception of the XR data. For example, the XR data communications 408 can arrive during a DRX off period, in which case the network node 402 can be unable to recognize the XR data communications 408. As a result, transmission of XR data can be unsuccessful, thereby negatively impacting network performance and/or XR service performance.

Priority can be used for physical layer collision handling. For example, two priorities can be defined: a low priority and a high priority. Priority levels can be indicated in a scheduling DCI (e.g., DCI format 0_1, 0_2 or 1_1, 1_2) for UL or DL data. For DL, the priority can be used for collision handling for the physical uplink control channel (PUCCH) that carries the hybrid automatic response request (HARQ)-acknowledgment (ACK) for the corresponding physical downlink shared channel (PDSCH). For configured grant (CG), priority can be configured in the radio resource control (RRC) CG configuration (e.g., the phy-PriorityIndex). In some cases, there may not be enough delay time for retransmission of cancelled data. As a result, transmission of XR data can be unsuccessful, thereby negatively impacting network performance and/or XR service performance.

Some aspects of the techniques and apparatuses described herein may provide delay-dependent priority for XR communications. For example, in some aspects, the multiple physical data communication channel occasions (e.g., physical uplink shared channel (PUSCH) occasions and/or PDSCH occasions) used to transfer XR data may have different priority values. In some aspects, multiple priority values may facilitate adaptative priority of XR data transmissions. For example, if high priority is configured for a CG occasion, a semi-persistent scheduling (SPS) occasion, or multiple PUSCH occasions and/or PDSCH occasions scheduled by a same DCI transmission, the high priority may be applied through the PUSCH occasions and/or PDSCH occasions on the same CG and/or SPS occasion, or through the PUSCH occasions and/or PDSCH occasions scheduled by the same DCI. If low priority is configured for the CG, SPS or the multiple PUSCH occasions and/or PDSCH occasions scheduled by the same DCI, the priority may be increased as the data transmission approaches the PDB deadline.

In some aspects, for example, a network node (e.g., the network node 402) may communicate, based at least in part on a physical data channel configuration corresponding to a physical data channel, a first XR data communication corresponding to a first physical data channel occasion associated with the physical data channel configuration. A first priority level may be associated with the first XR data communication. The network node (e.g., the network node 402) may communicate a second XR data communication corresponding to a second physical data channel occasion. A second priority level may be associated with the second XR data communication, and the second priority level may be higher than the first priority level based at least in part on a PDB associated with the physical data channel configuration being within a specified threshold of packet delay. In this way, some aspects may facilitate prioritization of XR data communications that are approaching a PDB deadline, thereby increasing a potential for successful reception of the XR data communications. As a result, some aspects may positively impact network performance and/or XR service performance.

As indicated above, FIG. 4 is provided as an example. Other examples may differ from what is described with regard to FIG. 4.

Figure 5:
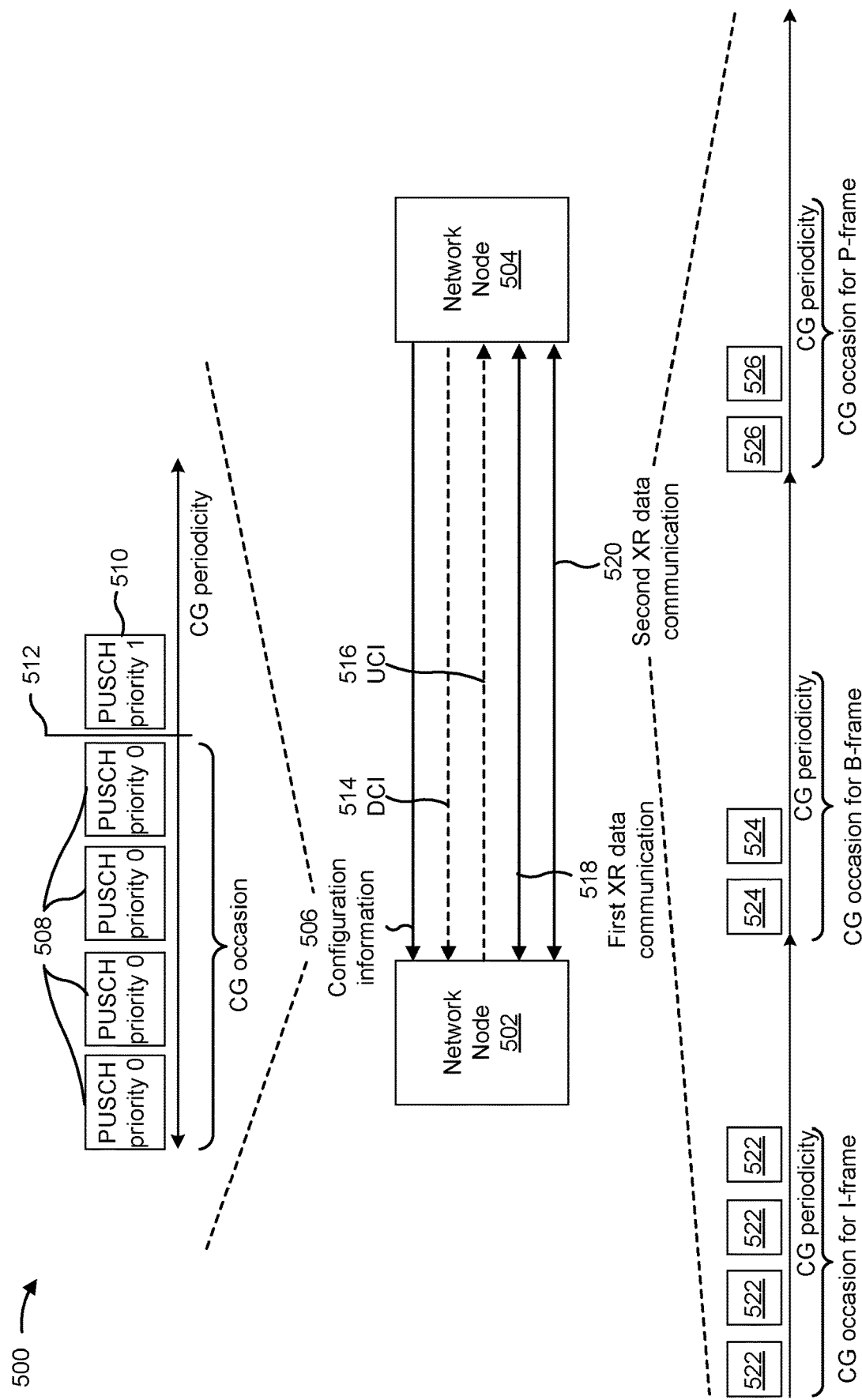
FIG. 5 is a diagram illustrating an example associated with delay-dependent priority for XR data communications, in accordance with the present disclosure.

FIG. 5 is a diagram illustrating an example 500 associated with delay-dependent priority for XR data communications, in accordance with the present disclosure. As shown in example 500, a network node 502 and a network node 504 may communicate with one another. The network node 502 and/or the network node 504 may be similar to the network node 402 and/or the network node 404. The network node 502 and/or the network node 504 may be, be similar to, include, or be included in, the network node 110 depicted in FIGS. 1 and 2, and/or the UE 120 depicted in FIGS. 1 and 2.

As shown by reference number 506, the network node 504 may transmit, and the network node 502 may receive, configuration information. The configuration information may include a physical data channel configuration corresponding to a physical data channel for carrying extended reality data communications. In some aspects, the configuration information may be carried in a radio resource control (RRC) message. In some aspects, the RRC message may indicate a specified threshold of packet delay for triggering a change in priority of XR data communications. For example, a first XR data communication may be transmitted in a first physical data communication occasion and may have an associated first priority level. In some aspects, the priority for a second XR data communication may be increased as the data transmission approaches a PDB deadline. For example, in some aspects, the priority level may be associated with the XR data communication as a result of the priority level being associated with a physical data channel communication occasion in which the XR data communication is transmitted. The priority of physical data channel communication occasions may be increased as the data transmission approaches the PDB deadline. For example, as shown in FIG. 5, a first four PUSCH occasions 508 (shown as "PUSCH priority 0") may be transmitted with a first priority (e.g., a low priority) and a fifth PUSCH occasion 510 (shown as "PUSCH priority 1") may be transmitted with a second priority (e.g. a high priority). In some aspects, the second priority level may be higher than the first priority level based at least in part on a PDB associated with the physical data channel configuration being within a specified threshold 512 of packet delay.

In some aspects, the specified threshold may include a time period associated with a reference time. The reference time may include a slot having a first occurring physical data channel occasion of a plurality of physical data channel occasions associated with the physical data channel configuration. In some aspects, the reference time may include a starting time associated with a connected mode discontinuous reception (DRX) on duration timer. In some aspects, the specified threshold may correspond to a quantity of physical data channel occasions. In some aspects, the specified threshold may correspond to a quantity of slots.

In some aspects, the physical data channel may include a PUSCH. In some aspects, the physical data channel configuration may include a configured grant. The first physical data channel occasions (e.g., the PUSCH occasions 508) may, as shown for example, correspond to a configured grant occasion. In some other aspects, the physical data channel may include a PDSCH. The physical data channel configuration may include an SPS configuration. For example, a first physical data channel occasion and a second physical data channel occasion may correspond to an SPS occasion. In some aspects, the first physical data channel occasion and the second physical data channel occasion may be scheduled by a downlink control information (DCI) transmission.

In some aspects, the specified threshold may correspond to each physical data channel occasion in a plurality of physical data channel occasions associated with a data association ID. The physical data channel configuration may indicate the data association ID. In some aspects, the data association ID may be associated with data corresponding to a video frame prior to an occurrence of the PDB deadline. The data association ID may be associated with data corresponding to a video frame prior to transmission corresponding to a physical data channel occasion associated with a different data association ID. In some aspects, the data association ID may be associated with at least one of a configured grant, an SPS configuration, or a dynamic grant. In some aspects, the data association ID may correspond to a plurality of physical data channel configurations. In some aspects, the data association ID may correspond to a plurality of physical data channel occasions scheduled by at least one DCI transmission. The at least one DCI transmission may include a priority indicator that indicates the second priority level and/or the first priority level (e.g., an initial priority level).

As shown by reference number 514, the network node 504 may transmit, and the network node 502 may receive, a scheduling DCI transmission that schedules a first XR data communication and a second XR data communication. The scheduling DCI transmission may indicate the data association ID. In some aspects, the DCI may indicate a first priority level and/or a second priority level. For example, ins some aspects, the DCI transmission may separately indicate priority for each PUSCH occasion and/or PDSCH occasion.

In some aspects, the physical data channel configuration may indicate a time domain resource allocation (TDRA) table that indicates a first set of scheduling parameters associated with a first priority indication value and a second set of scheduling parameters associated with a second priority indication value. The DCI may indicate one or multiple set of scheduling parameters from the TDRA table. In some aspects, for example, the first priority indication value may indicate the first priority level and the second priority indication value may indicate the second priority level. For each set of parameters (e.g., mapping type, start and length indicator (SLIV), and/or slot offset, time domain allocation DCI-PDSCH timing (K0), and/or time domain resource assignment (K2), among other examples) in each entry (i.e., row) of the TDRA table, the physical data channel configuration may configure a priority indication value. The DCI may indicate the table set of scheduling parameters, which may give the priority indication value. As shown by reference number 516, in some aspects, the network node 502 may transmit, and the network node 504 may receive, an uplink control information (UCI) transmission. The UCI may indicate the first priority level.

As shown by reference number 518, the network node 502 and/or the network node 504 may communicate, based at least in part on the physical data channel configuration, a first XR data communication corresponding to a first physical data channel occasion associated with the physical data channel configuration. Communicating an XR data communication may refer to transmitting the XR data communication or receiving the XR data communication. A first priority level may be associated with the first XR data communication. As shown by reference number 520, the network node 502 and/or the network node 504 may communicate a second XR data communication corresponding to a second physical data channel occasion. A second priority level may be associated with the second XR data communication, and the second priority level may be higher than the first priority level based at least in part on a PDB associated with the physical data channel configuration being within a specified threshold of packet delay.

In some aspects, the first physical data channel occasion may include a first PDSCH occasion and the second physical data channel occasion may include a second PDSCH occasion, and the second priority level may be higher than the first priority level based at least in part on the second PDSCH occasion colliding with the first PDSCH occasion in a time domain. For example, for multiple PDSCH occasions associated with the same XR video data, the scheduling DCI (e.g., a single DCI scheduling multiple PDSCHs) or SPS configuration (e.g., multiple PDSCH occasions on the same SPS occasion) may span several slots and conflict with a future PDSCH transmission may occur. In this case, cancellation of the PDSCH occasion with low priority by another PDSCH with high priority may be used to avoid collision. By using a delay-dependent priority design, as described herein, the PDSCH occasion with high priority may cancel a low priority PDSCH occasion for the beginning of the XR video frame. For the one or more PDSCH occasions carrying the end of the XR video frame, priority may be switched to a high priority level according to the delay dependent priority. In this way, a network node may not expect to cancel the one or more PDSCH occasions carrying the end of the XR video frame by another PDSCH occasion with high priority.

In some aspects, for video frame data transmission, configured grant and/or SPS periodicity may be configured to be matched to the video frame periodicity. For example, for group of pictures (GOP)-based video transmission, intra-coded frames (I-frames) may have different levels of importance to recreating a video signal than other frames such as predicted frames (P-frames) and/or bi-directional P-frames (B-frames). In some aspects, the periodic physical data communication occasions in corresponding configured grant or SPS occasions may be assigned different priority values based on the type of video frame being transmitted. In some aspects, for example, one periodic data communication occasion (e.g., a configured grant occasion and/or an SPS occasion) may have multiple physical data communication channel occasions with different transport blocks for a same video frame. In some other aspects, multiple periodic physical data communication occasions across periodic data communication configurations may have multiple physical data communication channel occasions with different transport blocks for a same video frame. For example, as shown, a CG occasion for an I-frame may include physical data communication channel occasions 522, a CG occasion for a B-frame may include physical data communication channel occasions 524, and a CG occasion for a P-frame may include physical data communication channel occasions 526.

In some aspects, for example, the physical data channel configuration may include a periodic physical data channel configuration that indicates a priority pattern associated with a plurality of periodic communication occasions. The priority pattern may be based at least in part on a priority periodicity associated with the plurality of periodic communication occasions. For example, the priority periodicity may correspond to a GOP pattern associated with a video frame corresponding to the first XR data communication and the second XR data communication. The periodic physical data channel configuration may indicate an occasion offset associated with a first periodic communication occasion, of the plurality of periodic communication occasions, corresponding to XR data associated with an I-frame of the GOP pattern. In some aspects, the first priority level may correspond to one or more periodic communication occasions associated with at least one of a P-frame of the GOP pattern or a B-frame of the GOP pattern. In some aspects, the second priority level may correspond to one or more periodic communication occasions, of the plurality of periodic communication occasions, associated with an I-frame of the GOP pattern.

In some aspects, for example, a priority periodicity N (e.g., defined in number of CG or SPS occasions), may match the corresponding GOP pattern. For example, N may be 12 for a GOP having 1 I-frame and 11 P-frames (and/or B-frames) for every GOP with 12 frames. In some aspects, an occasion offset may be indicated (e.g., in the configuration information, by a DCI transmission, and/or by a UCI transmission). The occasion offset may indicate a starting occasion such as, for example, a first occasion carrying data for an I-frame. In some aspects, a high priority may be associated with physical data communication occasions determined by a sum of an occasion offset and the product of N and the periodicity (e.g., associated with I-frame video data) and a low priority for other physical data communication occasions within other periodic communication occasions (e.g., CG and/or SPS occasions) (e.g., associated with P-frame video data and/or B-frame video data).

As indicated above, FIG. 5 is provided as an example. Other examples may differ from what is described with regard to FIG. 5.

Figure 6:
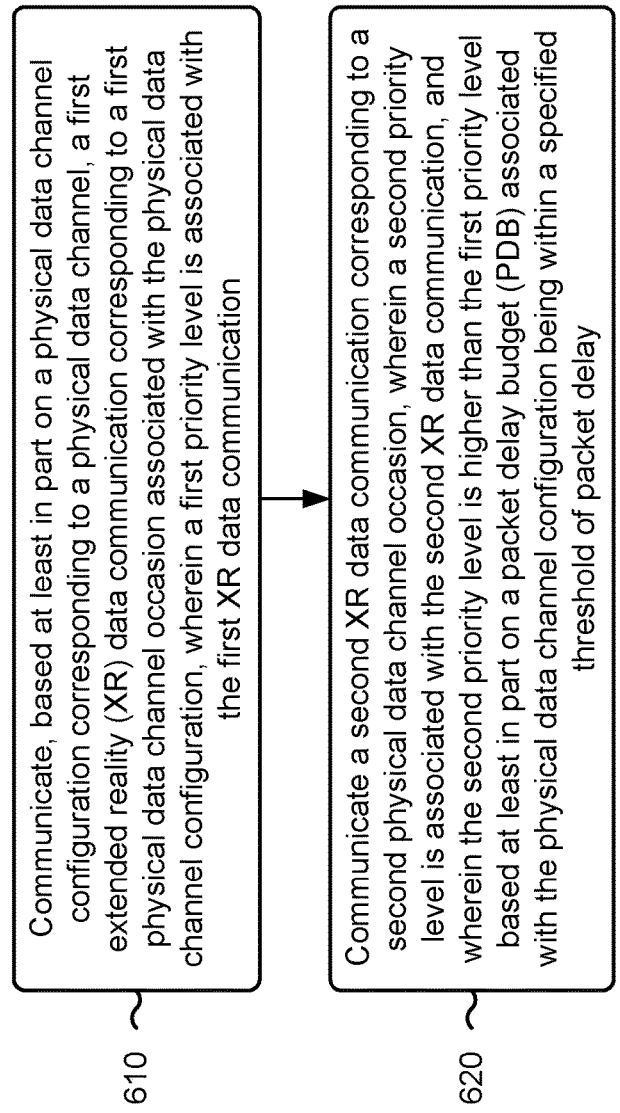
FIG. 6 is a diagram illustrating an example process performed, for example, by a network node, in accordance with the present disclosure.

FIG. 6 is a diagram illustrating an example process 600 performed, for example, by a network node, in accordance with the present disclosure. Example process 600 is an example where the network node (e.g., network node 502) performs operations associated with delay-dependent priority for XR data communications.

As shown in FIG. 6, in some aspects, process 600 may include communicating, based at least in part on a physical data channel configuration corresponding to a physical data channel, a first XR data communication corresponding to a first physical data channel occasion associated with the physical data channel configuration, wherein a first priority level is associated with the first XR data communication (block 610). For example, the network node (e.g., using communication manager 808, reception component 802, and/or transmission component 804, depicted in FIG. 8) may communicate, based at least in part on a physical data channel configuration corresponding to a physical data channel, a first XR data communication corresponding to a first physical data channel occasion associated with the physical data channel configuration, wherein a first priority level is associated with the first XR data communication, as described above.

As further shown in FIG. 6, in some aspects, process 600 may include communicating a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay (block 620). For example, the network node (e.g., using communication manager 808, reception component 802, and/or transmission component 804, depicted in FIG. 8) may communicate a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay, as described above.

Process 600 may include additional aspects, such as any single aspect or any combination of aspects described below and/or in connection with one or more other processes described elsewhere herein.

In some aspects, the physical data channel comprises a physical uplink shared channel. In some aspects, the physical data channel configuration comprises a configured grant. In some aspects, the first physical data channel occasion and the second physical data channel occasion correspond to a configured grant occasion. In some aspects, the physical data channel comprises a physical downlink shared channel. In some aspects, the physical data channel configuration comprises an SPS configuration. In some aspects, the first physical data channel occasion and the second physical data channel occasion correspond to an SPS occasion. In some aspects, the first physical data channel occasion and the second physical data channel occasion are scheduled by a downlink control information transmission. In some aspects, the specified threshold corresponds to a quantity of physical data channel occasions. In some aspects, the specified threshold corresponds to a quantity of slots.

In some aspects, process 600 includes receiving an RRC message that includes the physical data channel configuration. In some aspects, the RRC message indicates the specified threshold. In some aspects, the specified threshold comprises a time period associated with a reference time. In some aspects, the reference time comprises a slot having a first occurring physical data channel occasion of a plurality of physical data channel occasions associated with the physical data channel configuration. In some aspects, the reference time comprises a starting time associated with a connected mode discontinuous reception on duration timer.

In some aspects, alone or in combination with one or more of the first through fourteenth aspects, the specified threshold corresponds to each physical data channel occasion in a plurality of physical data channel occasions associated with a data association ID. In some aspects, process 600 includes receiving a scheduling DCI transmission that schedules the first XR data communication and the second XR data communication, wherein the scheduling DCI transmission indicates the data association ID. In some aspects, the physical data channel configuration indicates the data association ID. In some aspects, the data association ID is associated with data corresponding to a video frame prior to an occurrence of the PDB deadline. In a nineteenth aspect, the data association ID is associated with data corresponding to a video frame prior to transmission corresponding to a physical data channel occasion associated with a different data association ID.

In some aspects, the data association ID is associated with at least one of a configured grant, a semi-persistent scheduling configuration, or a dynamic grant. In some aspects, the data association ID corresponds to a plurality of physical data channel configurations including the physical data channel configuration. In some aspects, the data association ID corresponds to a plurality of physical data channel occasions scheduled by at least one DCI transmission. In some aspects, the at least one DCI transmission includes a priority indicator that indicates the second priority level. In some aspects, the data association ID is associated with a first periodic transmission occasion and a second periodic transmission occasion.

In some aspects, the physical data channel configuration comprises a configured grant configuration, the method further comprising transmitting a UCI transmission that indicates the first priority level. In some aspects, the physical data channel configuration comprises an SPS configuration, the method further comprising receiving a DCI transmission that indicates the first priority level. In some aspects, the DCI transmission indicates the second priority level.

In some aspects, alone or in combination with one or more of the first through twenty-seventh aspects, the physical data channel configuration indicates a TDRA table, wherein the TDRA table indicates a first set of scheduling parameters associated with a first priority indication value and a second set of scheduling parameters associated with a second priority indication value. In some aspects, the first priority indication value indicates the first priority level and the second priority indication value indicates the second priority level. In some aspects, the physical data channel configuration comprises a periodic physical data channel configuration, the method further comprising receiving a DCI transmission that indicates at least one priority value, wherein the at least one priority value corresponds to each physical data channel occasion associated with a periodic communication occasion corresponding to the periodic physical data channel configuration.

In some aspects, the first physical data channel occasion comprises a first PDSCH occasion and the second physical data channel occasion comprises a second PDSCH occasion, and wherein the second priority level is higher than the first priority level based at least in part on the second PDSCH occasion colliding with the first PDSCH occasion in a time domain. In some aspects, the physical data channel configuration comprises a periodic physical data channel configuration that indicates a priority pattern associated with a plurality of periodic communication occasions. In some aspects, the priority pattern is based at least in part on a priority periodicity associated with the plurality of periodic communication occasions.

In some aspects, the priority periodicity corresponds to a GOP pattern associated with a video frame corresponding to the first XR data communication and the second XR data communication. In some aspects, the periodic physical data channel configuration indicates an occasion offset associated with a first periodic communication occasion, of the plurality of periodic communication occasions, corresponding to XR data associated with an intra-coded frame of the GOP pattern. In some aspects, the first priority level corresponds to one or more periodic communication occasions associated with at least one of a predicted frame of the GOP pattern or a bi-directional predicted frame of the GOP pattern. In some aspects, the second priority level corresponds to one or more periodic communication occasions, of the plurality of periodic communication occasions, associated with an intra-coded frame of the GOP pattern.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
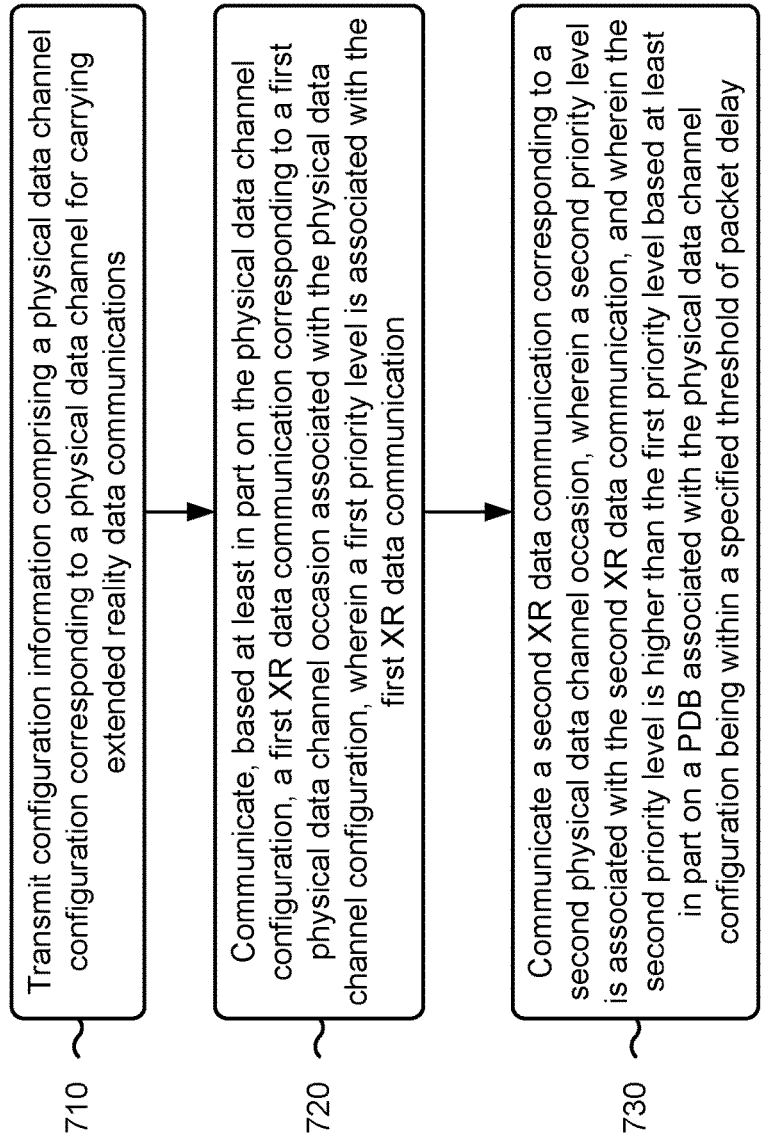
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 504) performs operations associated with delay-dependent priority for XR data communications.

As shown in FIG. 7, in some aspects, process 700 may include transmitting configuration information comprising a physical data channel configuration corresponding to a physical data channel for carrying extended reality data communications (block 710). For example, the network node (e.g., using communication manager 808 and/or transmission component 804, depicted in FIG. 8) may transmit configuration information comprising a physical data channel configuration corresponding to a physical data channel for carrying extended reality data communications, as described above.

As further shown in FIG. 7, in some aspects, process 700 may include communicating, based at least in part on the physical data channel configuration, a first XR data communication corresponding to a first physical data channel occasion associated with the physical data channel configuration, wherein a first priority level is associated with the first XR data communication (block 720). For example, the network node (e.g., using communication manager 808, reception component 802, and/or transmission component 804, depicted in FIG. 8) may communicate, based at least in part on the physical data channel configuration, a first XR data communication corresponding to a first physical data channel occasion associated with the physical data channel configuration, wherein a first priority level is associated with the first XR data communication, as described above.

As further shown in FIG. 7, in some aspects, process 700 may include communicating a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay (block 730). For example, the network node (e.g., using communication manager 808, reception component 802, and/or transmission component 804, depicted in FIG. 8) may communicate a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay, as described above.

Process 700 may include additional aspects, such as any single aspect or any combination of aspects described below and/or in connection with one or more other processes described elsewhere herein.

In some aspects, the physical data channel comprises a physical uplink shared channel. In some aspects, the physical data channel configuration comprises a configured grant. In some aspects, the first physical data channel occasion and the second physical data channel occasion correspond to a configured grant occasion. In some aspects, the physical data channel comprises a physical downlink shared channel. In some aspects, the physical data channel configuration comprises a semi-persistent scheduling (SPS) configuration. In some aspects, the first physical data channel occasion and the second physical data channel occasion correspond to an SPS occasion.

In some aspects, the first physical data channel occasion and the second physical data channel occasion are scheduled by a downlink control information transmission. In some aspects, the specified threshold corresponds to a quantity of physical data channel occasions. In a ninth aspect, alone or in combination with one or more of the first through eighth aspects, the specified threshold corresponds to a quantity of slots. In some aspects, process 700 includes transmitting an RRC message that includes the physical data channel configuration. In some aspects, the RRC message indicates the specified threshold.

In some aspects, the specified threshold comprises a time period associated with a reference time. In some aspects, the reference time comprises a slot having a first occurring physical data channel occasion of a plurality of physical data channel occasions associated with the physical data channel configuration. In some aspects, the reference time comprises a starting time associated with a connected mode discontinuous reception on duration timer. In some aspects, the specified threshold corresponds to each physical data channel occasion in a plurality of physical data channel occasions associated with a data association ID.

In some aspects, process 700 includes transmitting a scheduling DCI transmission that schedules the first XR data communication and the second XR data communication, wherein the scheduling DCI transmission indicates the data association ID. In some aspects, the physical data channel configuration indicates the data association ID. In some aspects, the data association ID is associated with data corresponding to a video frame prior to an occurrence of the PDB deadline. In some aspects, the data association ID is associated with data corresponding to a video frame prior to transmission corresponding to a physical data channel occasion associated with a different data association ID.

In some aspects, the data association ID is associated with at least one of a configured grant, a semi-persistent scheduling configuration, or a dynamic grant. In some aspects, the data association ID corresponds to a plurality of physical data channel configurations including the physical data channel configuration. In some aspects, the data association ID corresponds to a plurality of physical data channel occasions scheduled by at least one DCI transmission. In some aspects, the at least one DCI transmission includes a priority indicator that indicates the second priority level. In some aspects, the data association ID is associated with a first periodic transmission occasion and a second periodic transmission occasion.

In some aspects, the physical data channel configuration comprises a configured grant configuration, the method further comprising receiving a UCI transmission that indicates the first priority level. In some aspects, the physical data channel configuration comprises an SPS configuration, the method further comprising transmitting a DCI transmission that indicates the first priority level. In some aspects, the DCI transmission indicates the second priority level.

In some aspects, the physical data channel configuration indicates a TDRA table, wherein the TDRA table indicates a first set of scheduling parameters associated with a first priority indication value and a second set of scheduling parameters associated with a second priority indication value. In some aspects, the first priority indication value indicates the first priority level and the second priority indication value indicates the second priority level. In some aspects, the physical data channel configuration comprises a periodic physical data channel configuration, the method further comprising transmitting a DCI transmission that indicates at least one priority value, wherein the at least one priority value corresponds to each physical data channel occasion associated with a periodic communication occasion corresponding to the periodic physical data channel configuration. In some aspects, the first physical data channel occasion comprises a first PDSCH occasion and the second physical data channel occasion comprises a second PDSCH occasion, and wherein the second priority level is higher than the first priority level based at least in part on the second PDSCH occasion colliding with the first PDSCH occasion in a time domain.

In some aspects, the physical data channel configuration comprises a periodic physical data channel configuration that indicates a priority pattern associated with a plurality of periodic communication occasions. In some aspects, the priority pattern is based at least in part on a priority periodicity associated with the plurality of periodic communication occasions. In some aspects, the priority periodicity corresponds to a GOP pattern associated with a video frame corresponding to the first XR data communication and the second XR data communication. In some aspects, the periodic physical data channel configuration indicates an occasion offset associated with a first periodic communication occasion, of the plurality of periodic communication occasions, corresponding to XR data associated with an intra-coded frame of the GOP pattern. In some aspects, the first priority level corresponds to one or more periodic communication occasions associated with at least one of a predicted frame of the GOP pattern or a bi-directional predicted frame of the GOP pattern. In some aspects, the second priority level corresponds to one or more periodic communication occasions, of the plurality of periodic communication occasions, associated with an intra-coded frame of the GOP pattern.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
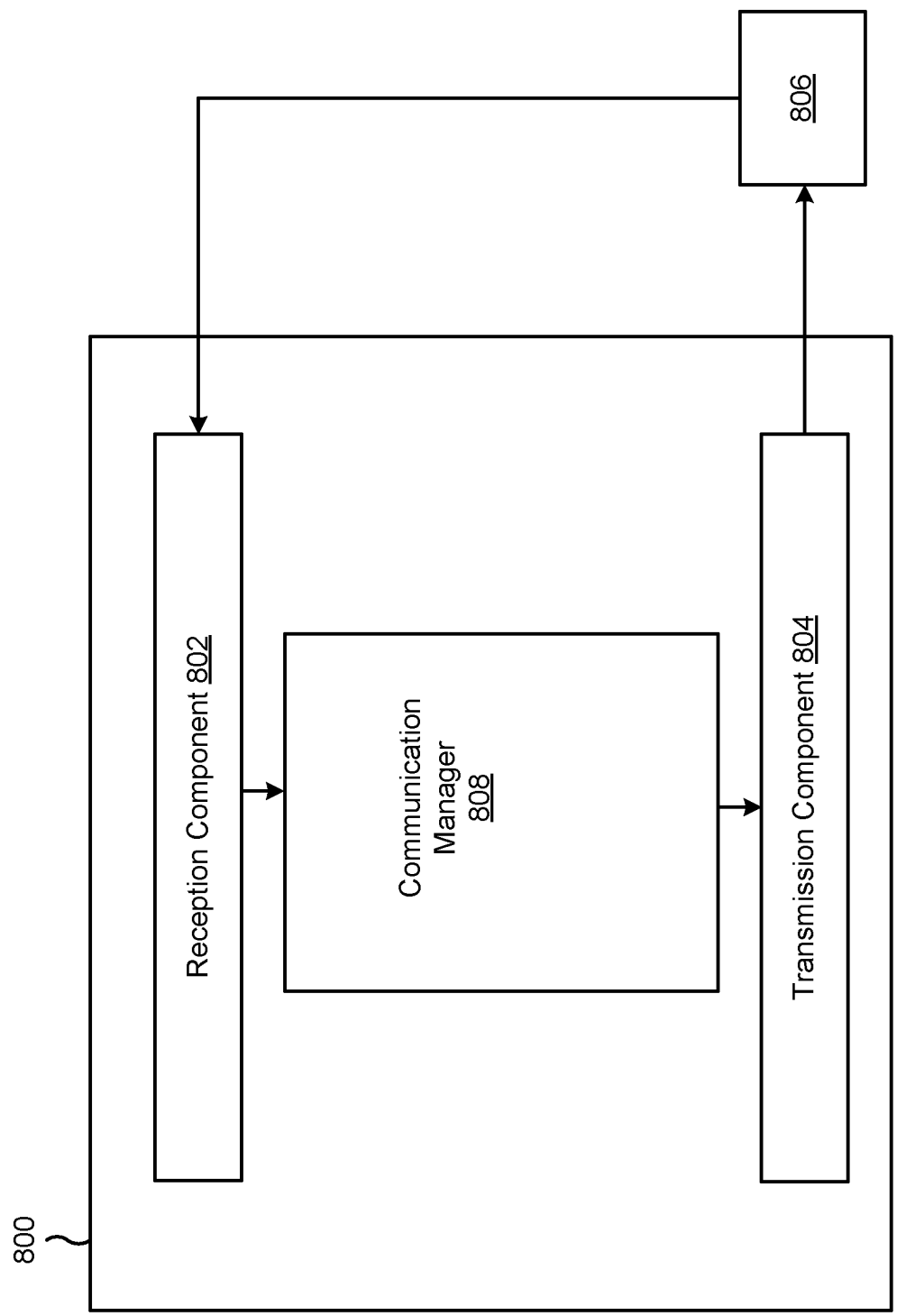
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network node described in connection with FIG. 2. In some aspects, the transmission component 804 may be co-located with the reception component 802 in a transceiver.

The communication manager 808, the reception component 802, and/or the transmission component 804 may communicate, based at least in part on a physical data channel configuration corresponding to a physical data channel, a first XR data communication corresponding to a first physical data channel occasion associated with the physical data channel configuration, wherein a first priority level is associated with the first XR data communication. In some aspects, the communication manager 808 may include one or more antennas, a modem, a controller/processor, a memory, or a combination thereof, of the UE and/or the network node described in connection with FIG. 2. In some aspects, the communication manager 808 may include the reception component 802 and/or the transmission component 804. In some aspects, the communication manager 808 may be, be similar to, include, or be included in, the communication manager 140 and/or the communication manager 150, depicted in FIGS. 1 and 2.

The communication manager 808, the reception component 802, and/or the transmission component 804 may communicate a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

The reception component 802 may receive an RRC message that includes the physical data channel configuration. The reception component 802 may receive a scheduling DCI transmission that schedules the first XR data communication and the second XR data communication, wherein the scheduling DCI transmission indicates the data association ID.

The transmission component 804 may transmit configuration information comprising a physical data channel configuration corresponding to a physical data channel for carrying extended reality data communications. The communication manager 808, the reception component 802, and/or the transmission component 804 may communicate, based at least in part on the physical data channel configuration, a first XR data communication corresponding to a first physical data channel occasion associated with the physical data channel configuration, wherein a first priority level is associated with the first XR data communication. The communication manager 808, the reception component 802, and/or the transmission component 804 may communicate a second XR data communication corresponding to a second physical data channel occasion, wherein a second priority level is associated with the second XR data communication, and wherein the second priority level is higher than the first priority level based at least in part on a PDB associated with the physical data channel configuration being within a specified threshold of packet delay.

The transmission component 804 may transmit an RRC message that includes the physical data channel configuration. The transmission component 804 may transmit a scheduling DCI transmission that schedules the first XR data communication and the second XR data communication, wherein the scheduling DCI transmission indicates the data association ID.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a network node, comprising: communicating, based at least in part on a physical data channel configuration corresponding to a physical data channel, a first extended reality (XR) data communication corresponding to a first physical data channel occasion associated with the physical data channel configuration, wherein a first priority level is associated with the first XR data communication; and communicating a second XR data communication corresponding to a second physical data channel occasion, wherein a second priority level is associated with the second XR data communication, and wherein the second priority level is higher than the first priority level based at least in part on a packet delay budget (PDB) associated with the physical data channel configuration being within a specified threshold of packet delay.

Aspect 2: The method of Aspect 1, wherein the physical data channel comprises a physical uplink shared channel.

Aspect 3: The method of either of Aspects 1 or 2, wherein the physical data channel configuration comprises a configured grant.

Aspect 4: The method of Aspect 3, wherein the first physical data channel occasion and the second physical data channel occasion correspond to a configured grant occasion.

Aspect 5: The method of Aspect 1, wherein the physical data channel comprises a physical downlink shared channel.

Aspect 6: The method of either of Aspects 1 or 5, wherein the physical data channel configuration comprises a semi-persistent scheduling (SPS) configuration.

Aspect 7: The method of Aspect 6, wherein the first physical data channel occasion and the second physical data channel occasion correspond to an SPS occasion.

Aspect 8: The method of any of Aspects 1 or 5-7, wherein the first physical data channel occasion and the second physical data channel occasion are scheduled by a downlink control information transmission.

Aspect 9: The method of any of Aspects 1-8, wherein the specified threshold corresponds to a quantity of physical data channel occasions.

Aspect 10: The method of any of Aspects 1-9, wherein the specified threshold corresponds to a quantity of slots.

Aspect 11: The method of any of Aspects 1-10, further comprising receiving a radio resource control (RRC) message that includes the physical data channel configuration.

Aspect 12: The method of Aspect 11, wherein the RRC message indicates the specified threshold.

Aspect 13: The method of any of Aspects 1-12, wherein the specified threshold comprises a time period associated with a reference time.

Aspect 14: The method of Aspect 13, wherein the reference time comprises a slot having a first occurring physical data channel occasion of a plurality of physical data channel occasions associated with the physical data channel configuration.

Aspect 15: The method of Aspect 13, wherein the reference time comprises a starting time associated with a connected mode discontinuous reception on duration timer.

Aspect 16: The method of any of Aspects 1-15, wherein the specified threshold corresponds to each physical data channel occasion in a plurality of physical data channel occasions associated with a data association identifier (ID).

Aspect 17: The method of Aspect 16, further comprising receiving a scheduling downlink control information (DCI) transmission that schedules the first XR data communication and the second XR data communication, wherein the scheduling DCI transmission indicates the data association ID.

Aspect 18: The method of either of Aspects 16 or 17, wherein the physical data channel configuration indicates the data association ID.

Aspect 19: The method of any of Aspects 16-18, wherein the data association ID is associated with data corresponding to a video frame prior to an occurrence of a PDB deadline.

Aspect 20: The method of any of Aspects 16-19, wherein the data association ID is associated with data corresponding to a video frame prior to transmission corresponding to a physical data channel occasion associated with a different data association ID.

Aspect 21: The method of any of Aspects 16-20, wherein the data association ID is associated with at least one of a configured grant, a semi-persistent scheduling configuration, or a dynamic grant.

Aspect 22: The method of any of Aspects 16-21, wherein the data association ID corresponds to a plurality of physical data channel configurations including the physical data channel configuration.

Aspect 23: The method of any of Aspects 16-22, wherein the data association ID corresponds to a plurality of physical data channel occasions scheduled by at least one downlink control information (DCI) transmission.

Aspect 24: The method of Aspect 23, wherein the at least one DCI transmission includes a priority indicator that indicates the second priority level.

Aspect 25: The method of any of Aspects 16-24, wherein the data association ID is associated with a first periodic transmission occasion and a second periodic transmission occasion.

Aspect 26: The method of any of Aspects 1-25, wherein the physical data channel configuration comprises a configured grant configuration, the method further comprising transmitting an uplink control information (UCI) transmission that indicates the first priority level.

Aspect 27: The method of any of Aspects 1-26, wherein the physical data channel configuration comprises a semi-persistent scheduling (SPS) configuration, the method further comprising receiving a downlink control information (DCI) transmission that indicates the first priority level.

Aspect 28: The method of Aspect 27, wherein the DCI transmission indicates the second priority level.

Aspect 29: The method of Aspect 28, wherein the physical data channel configuration indicates a time domain resource allocation (TDRA) table, wherein the TDRA table indicates a first set of scheduling parameters associated with a first priority indication value and a second set of scheduling parameters associated with a second priority indication value.

Aspect 30: The method of Aspect 29, wherein the first priority indication value indicates the first priority level and the second priority indication value indicates the second priority level.

Aspect 31: The method of Aspect 1, wherein the physical data channel configuration comprises a periodic physical data channel configuration, the method further comprising receiving a downlink control information (DCI) transmission that indicates at least one priority value, wherein the at least one priority value corresponds to each physical data channel occasion associated with a periodic communication occasion corresponding to the periodic physical data channel configuration.

Aspect 32: The method of Aspect 1, wherein the first physical data channel occasion comprises a first physical downlink shared channel (PDSCH) occasion and the second physical data channel occasion comprises a second PDSCH occasion, and wherein the second priority level is higher than the first priority level based at least in part on the second PDSCH occasion colliding with the first PDSCH occasion in a time domain.

Aspect 33: The method of any of Aspects 1-32, wherein the physical data channel configuration comprises a periodic physical data channel configuration that indicates a priority pattern associated with a plurality of periodic communication occasions.

Aspect 34: The method of Aspect 33, wherein the priority pattern is based at least in part on a priority periodicity associated with the plurality of periodic communication occasions.

Aspect 35: The method of Aspect 34, wherein the priority periodicity corresponds to a group of pictures (GOP) pattern associated with a video frame corresponding to the first XR data communication and the second XR data communication.

Aspect 36: The method of Aspect 35, wherein the periodic physical data channel configuration indicates an occasion offset associated with a first periodic communication occasion, of the plurality of periodic communication occasions, corresponding to XR data associated with an intra-coded frame of the GOP pattern.

Aspect 37: The method of either of Aspects 35 or 36, wherein the first priority level corresponds to one or more periodic communication occasions associated with at least one of a predicted frame of the GOP pattern or a bi-directional predicted frame of the GOP pattern.

Aspect 38: The method of any of Aspects 35-37, wherein the second priority level corresponds to one or more periodic communication occasions, of the plurality of periodic communication occasions, associated with an intra-coded frame of the GOP pattern.

Aspect 39: A method of wireless communication performed by a network node, comprising: transmitting configuration information comprising a physical data channel configuration corresponding to a physical data channel for carrying extended reality data communications; communicating, based at least in part on the physical data channel configuration, a first XR data communication corresponding to a first physical data channel occasion associated with the physical data channel configuration, wherein a first priority level is associated with the first XR data communication; and communicating a second XR data communication corresponding to a second physical data channel occasion, wherein a second priority level is associated with the second XR data communication, and wherein the second priority level is higher than the first priority level based at least in part on a packet delay budget (PDB) associated with the physical data channel configuration being within a specified threshold of packet delay.

Aspect 40: The method of Aspect 39, wherein the physical data channel comprises a physical uplink shared channel.

Aspect 41: The method of Aspect 39, wherein the physical data channel configuration comprises a configured grant.

Aspect 42: The method of Aspect 41, wherein the first physical data channel occasion and the second physical data channel occasion correspond to a configured grant occasion.

Aspect 43: The method of Aspect 39, wherein the physical data channel comprises a physical downlink shared channel.

Aspect 44: The method of either of Aspects 39 or 43, wherein the physical data channel configuration comprises a semi-persistent scheduling (SPS) configuration.

Aspect 45: The method of Aspect 44, wherein the first physical data channel occasion and the second physical data channel occasion correspond to an SPS occasion.

Aspect 46: The method of any of Aspects 39 or 43-45, wherein the first physical data channel occasion and the second physical data channel occasion are scheduled by a downlink control information transmission.

Aspect 47: The method of any of Aspects 39-46, wherein the specified threshold corresponds to a quantity of physical data channel occasions.

Aspect 48: The method of any of Aspects 39-47, wherein the specified threshold corresponds to a quantity of slots.

Aspect 49: The method of any of Aspects 39-48, further comprising transmitting a radio resource control (RRC) message that includes the physical data channel configuration.

Aspect 50: The method of Aspect 49, wherein the RRC message indicates the specified threshold.

Aspect 51: The method of any of Aspects 39-50, wherein the specified threshold comprises a time period associated with a reference time.

Aspect 52: The method of Aspect 51, wherein the reference time comprises a slot having a first occurring physical data channel occasion of a plurality of physical data channel occasions associated with the physical data channel configuration.

Aspect 53: The method of Aspect 51, wherein the reference time comprises a starting time associated with a connected mode discontinuous reception on duration timer.

Aspect 54: The method of any of Aspects 39-53, wherein the specified threshold corresponds to each physical data channel occasion in a plurality of physical data channel occasions associated with a data association identifier (ID).

Aspect 55: The method of Aspect 54, further comprising transmitting a scheduling downlink control information (DCI) transmission that schedules the first XR data communication and the second XR data communication, wherein the scheduling DCI transmission indicates the data association ID.

Aspect 56: The method of either of Aspects 54 or 55, wherein the physical data channel configuration indicates the data association ID.

Aspect 57: The method of any of Aspects 54-56, wherein the data association ID is associated with data corresponding to a video frame prior to an occurrence of a PDB deadline.

Aspect 58: The method of any of Aspects 54-57, wherein the data association ID is associated with data corresponding to a video frame prior to transmission corresponding to a physical data channel occasion associated with a different data association ID.

Aspect 59: The method of any of Aspects 54-58, wherein the data association ID is associated with at least one of a configured grant, a semi-persistent scheduling configuration, or a dynamic grant.

Aspect 60: The method of any of Aspects 54-59, wherein the data association ID corresponds to a plurality of physical data channel configurations including the physical data channel configuration.

Aspect 61: The method of any of Aspects 54-60, wherein the data association ID corresponds to a plurality of physical data channel occasions scheduled by at least one downlink control information (DCI) transmission.

Aspect 62: The method of Aspect 61, wherein the at least one DCI transmission includes a priority indicator that indicates the second priority level.

Aspect 63: The method of any of Aspects 54-62, wherein the data association ID is associated with a first periodic transmission occasion and a second periodic transmission occasion.

Aspect 64: The method of Aspect 39, wherein the physical data channel configuration comprises a configured grant configuration, the method further comprising receiving an uplink control information (UCI) transmission that indicates the first priority level.

Aspect 65: The method of Aspect 39, wherein the physical data channel configuration comprises a semi-persistent scheduling (SPS) configuration, the method further comprising transmitting a downlink control information (DCI) transmission that indicates the first priority level.

Aspect 66: The method of Aspect 65, wherein the DCI transmission indicates the second priority level.

Aspect 67: The method of Aspect 66, wherein the physical data channel configuration indicates a time domain resource allocation (TDRA) table, wherein the TDRA table indicates a first set of scheduling parameters associated with a first priority indication value and a second set of scheduling parameters associated with a second priority indication value.

Aspect 68: The method of Aspect 67, wherein the first priority indication value indicates the first priority level and the second priority indication value indicates the second priority level.

Aspect 69: The method of Aspect 39, wherein the physical data channel configuration comprises a periodic physical data channel configuration, the method further comprising transmitting a downlink control information (DCI) transmission that indicates at least one priority value, wherein the at least one priority value corresponds to each physical data channel occasion associated with a periodic communication occasion corresponding to the periodic physical data channel configuration.

Aspect 70: The method of either of Aspects 39 or 69, wherein the first physical data channel occasion comprises a first physical downlink shared channel (PDSCH) occasion and the second physical data channel occasion comprises a second PDSCH occasion, and wherein the second priority level is higher than the first priority level based at least in part on the second PDSCH occasion colliding with the first PDSCH occasion in a time domain.

Aspect 71: The method of any of Aspects 39-70, wherein the physical data channel configuration comprises a periodic physical data channel configuration that indicates a priority pattern associated with a plurality of periodic communication occasions.

Aspect 72: The method of Aspect 71, wherein the priority pattern is based at least in part on a priority periodicity associated with the plurality of periodic communication occasions.

Aspect 73: The method of Aspect 72, wherein the priority periodicity corresponds to a group of pictures (GOP) pattern associated with a video frame corresponding to the first XR data communication and the second XR data communication.

Aspect 74: The method of Aspect 73, wherein the periodic physical data channel configuration indicates an occasion offset associated with a first periodic communication occasion, of the plurality of periodic communication occasions, corresponding to XR data associated with an intra-coded frame of the GOP pattern.

Aspect 75: The method of either of Aspects 73 or 74, wherein the first priority level corresponds to one or more periodic communication occasions associated with at least one of a predicted frame of the GOP pattern or a bi-directional predicted frame of the GOP pattern.

Aspect 76: The method of any of Aspects 73-75, wherein the second priority level corresponds to one or more periodic communication occasions, of the plurality of periodic communication occasions, associated with an intra-coded frame of the GOP pattern.

Aspect 77: An apparatus for wireless communication at a device, comprising a processor; memory coupled with the processor; and instructions stored in the memory and executable by the processor to cause the apparatus to perform the method of one or more of Aspects 1-38.

Aspect 78: A device for wireless communication, comprising a memory and one or more processors coupled to the memory, the one or more processors configured to perform the method of one or more of Aspects 1-38.

Aspect 79: An apparatus for wireless communication, comprising at least one means for performing the method of one or more of Aspects 1-38.

Aspect 80: A non-transitory computer-readable medium storing code for wireless communication, the code comprising instructions executable by a processor to perform the method of one or more of Aspects 1-38.

Aspect 81: A non-transitory computer-readable medium storing a set of instructions for wireless communication, the set of instructions comprising one or more instructions that, when executed by one or more processors of a device, cause the device to perform the method of one or more of Aspects 1-38.

Aspect 82: An apparatus for wireless communication at a device, comprising a processor; memory coupled with the processor; and instructions stored in the memory and executable by the processor to cause the apparatus to perform the method of one or more of Aspects 39-76.

Aspect 83: A device for wireless communication, comprising a memory and one or more processors coupled to the memory, the one or more processors configured to perform the method of one or more of Aspects 39-76.

Aspect 84: An apparatus for wireless communication, comprising at least one means for performing the method of one or more of Aspects 39-76.

Aspect 85: A non-transitory computer-readable medium storing code for wireless communication, the code comprising instructions executable by a processor to perform the method of one or more of Aspects 39-76.

Aspect 86: A non-transitory computer-readable medium storing a set of instructions for wireless communication, the set of instructions comprising one or more instructions that, when executed by one or more processors of a device, cause the device to perform the method of one or more of Aspects 39-76.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   one or more memories; and
   one or more processors, coupled to the one or more memories, configured to:
      communicate, based at least in part on a physical data channel configuration corresponding to a physical data channel, a first extended reality (XR) data communication corresponding to a first physical data channel occasion associated with the physical data channel configuration, wherein a first priority level is associated with the first XR data communication; and
      communicate a second XR data communication corresponding to a second physical data channel occasion, wherein a second priority level is associated with the second XR data communication, and wherein the second priority level is higher than the first priority level based at least in part on a packet delay budget (PDB) associated with the physical data channel configuration being within a specified threshold of packet delay that triggers a change in priority of one or more XR data communications.

2. The network node of claim 1, wherein the physical data channel comprises a physical uplink shared channel, and wherein the physical data channel configuration comprises a configured grant.

3. The network node of claim 2, wherein the first physical data channel occasion and the second physical data channel occasion correspond to a configured grant occasion.

4. The network node of claim 1, wherein the physical data channel comprises a physical downlink shared channel, and wherein the physical data channel configuration comprises a semi-persistent scheduling (SPS) configuration.

5. The network node of claim 4, wherein the first physical data channel occasion and the second physical data channel occasion correspond to an SPS occasion.

6. The network node of claim 1, wherein the first physical data channel occasion and the second physical data channel occasion are scheduled by a downlink control information transmission.

7. The network node of claim 1, wherein the specified threshold corresponds to at least one of a quantity of physical data channel occasions or a quantity of slots.

8. The network node of claim 1, wherein the one or more processors are further configured to receive a radio resource control (RRC) message that includes the physical data channel configuration, wherein the RRC message indicates the specified threshold.

9. The network node of claim 1, wherein the specified threshold comprises a time period associated with a reference time, wherein the reference time comprises a slot having a first occurring physical data channel occasion of a plurality of physical data channel occasions associated with the physical data channel configuration or a starting time associated with a connected mode discontinuous reception on duration timer.

10. The network node of claim 1, wherein the specified threshold corresponds to each physical data channel occasion in a plurality of physical data channel occasions associated with a data association identifier (ID).

11. The network node of claim 10, wherein the one or more processors are further configured to receive a scheduling downlink control information (DCI) transmission that schedules the first XR data communication and the second XR data communication, wherein the scheduling DCI transmission indicates the data association ID.

12. The network node of claim 11, wherein the physical data channel configuration indicates the data association ID.

13. The network node of claim 11, wherein the data association ID is associated with data corresponding to a video frame prior to at least one of an occurrence of a PDB deadline or a transmission corresponding to a physical data channel occasion associated with a different data association ID.

14. The network node of claim 11, wherein the data association ID is associated with at least one of a configured grant, a semi-persistent scheduling configuration, or a dynamic grant.

15. The network node of claim 11, wherein the data association ID corresponds to a plurality of physical data channel configurations including the physical data channel configuration.

16. The network node of claim 11, wherein the data association ID corresponds to a plurality of physical data channel occasions scheduled by at least one downlink control information (DCI) transmission, wherein the at least one DCI transmission includes a priority indicator that indicates the second priority level, and wherein the data association ID is associated with a first periodic transmission occasion and a second periodic transmission occasion.

17. The network node of claim 1, wherein the physical data channel configuration comprises a configured grant configuration, and wherein the one or more processors are further configured to transmit an uplink control information (UCI) transmission that indicates the first priority level.

18. The network node of claim 1, wherein the physical data channel configuration comprises a semi-persistent scheduling (SPS) configuration, and wherein the one or more processors are further configured to receive a downlink control information (DCI) transmission that indicates the first priority level.

19. The network node of claim 18, wherein the DCI transmission indicates the second priority level, wherein the physical data channel configuration indicates a time domain resource allocation (TDRA) table, wherein the TDRA table indicates a first set of scheduling parameters associated with a first priority indication value and a second set of scheduling parameters associated with a second priority indication value, and wherein the first priority indication value indicates the first priority level and the second priority indication value indicates the second priority level.

20. The network node of claim 1, wherein the physical data channel configuration comprises a periodic physical data channel configuration, and wherein the one or more processors are further configured to receive a downlink control information (DCI) transmission that indicates at least one priority value, wherein the at least one priority value corresponds to each physical data channel occasion associated with a periodic communication occasion corresponding to the periodic physical data channel configuration.

21. The network node of claim 1, wherein the first physical data channel occasion comprises a first physical downlink shared channel (PDSCH) occasion and the second physical data channel occasion comprises a second PDSCH occasion, and wherein the second priority level is higher than the first priority level based at least in part on the second PDSCH occasion colliding, in a time domain, with the first PDSCH occasion.

22. The network node of claim 1, wherein the physical data channel configuration comprises a periodic physical data channel configuration that indicates a priority pattern associated with a plurality of periodic communication occasions.

23. The network node of claim 22, wherein the priority pattern is based at least in part on a priority periodicity associated with the plurality of periodic communication occasions, wherein the priority periodicity corresponds to a group of pictures (GOP) pattern associated with a video frame corresponding to the first XR data communication and the second XR data communication.

24. The network node of claim 23, wherein the periodic physical data channel configuration indicates an occasion offset associated with a first periodic communication occasion, of the plurality of periodic communication occasions, corresponding to XR data associated with an intra-coded frame of the GOP pattern, wherein the first priority level corresponds to one or more periodic communication occasions associated with at least one of a predicted frame of the GOP pattern or a bi-directional predicted frame of the GOP pattern, and wherein the second priority level corresponds to one or more periodic communication occasions, of the plurality of periodic communication occasions, associated with the intra-coded frame of the GOP pattern.

25. A network node for wireless communication, comprising:
one or more memories; and
one or more processors, coupled to the one or more memories, configured to:
transmit configuration information comprising a physical data channel configuration corresponding to a physical data channel for carrying extended reality (XR) data communications;
communicate, based at least in part on the physical data channel configuration, a first XR data communication corresponding to a first physical data channel occasion associated with the physical data channel configuration, wherein a first priority level is associated with the first XR data communication; and
communicate a second XR data communication corresponding to a second physical data channel occasion, wherein a second priority level is associated with the second XR data communication, and wherein the second priority level is higher than the first priority level based at least in part on a packet delay budget (PDB) associated with the physical data channel configuration being within a specified threshold of packet delay that triggers a change in priority of the XR data communications.

26. The network node of claim 25, wherein the physical data channel configuration comprises a configured grant or a semi-persistent scheduling configuration.

27. A method of wireless communication performed by a network node, comprising:
communicating, based at least in part on a physical data channel configuration corresponding to a physical data channel, a first extended reality (XR) data communication corresponding to a first physical data channel occasion associated with the physical data channel configuration, wherein a first priority level is associated with the first XR data communication; and
communicating a second XR data communication corresponding to a second physical data channel occasion, wherein a second priority level is associated with the second XR data communication, and wherein the second priority level is higher than the first priority level based at least in part on a packet delay budget (PDB) associated with the physical data channel configuration being within a specified threshold of packet delay that triggers a change in priority of one or more XR data communications.

28. The method of claim 27, wherein the physical data channel configuration comprises a configured grant or a semi-persistent scheduling configuration.

29. A method of wireless communication performed by a network node, comprising:
 transmitting configuration information comprising a physical data channel configuration corresponding to a physical data channel for carrying extended reality (XR) data communications;
 communicating, based at least in part on the physical data channel configuration, a first XR data communication corresponding to a first physical data channel occasion associated with the physical data channel configuration, wherein a first priority level is associated with the first XR data communication; and
 communicating a second XR data communication corresponding to a second physical data channel occasion, wherein a second priority level is associated with the second XR data communication, and wherein the second priority level is higher than the first priority level based at least in part on a packet delay budget (PDB) associated with the physical data channel configuration being within a specified threshold of packet delay that triggers a change in priority of the XR data communications.

30. The method of claim 29, wherein the physical data channel configuration comprises a configured grant or a semi-persistent scheduling configuration.

\* \* \* \* \*